United States Patent
Kagoshima

(10) Patent No.: US 8,421,415 B2
(45) Date of Patent: Apr. 16, 2013

(54) HYBRID WORKING MACHINE HAVING BATTERY PROTECTING FUNCTION

(75) Inventor: Masayuki Kagoshima, Hiroshima (JP)

(73) Assignee: Kobelco Construction Machinery Co., Ltd., Hiroshima-shi (JP)

(*) Notice: Subject to any disclaimer, the term of this patent is extended or adjusted under 35 U.S.C. 154(b) by 220 days.

(21) Appl. No.: 13/084,759

(22) Filed: Apr. 12, 2011

(65) Prior Publication Data
US 2011/0254513 A1    Oct. 20, 2011

(30) Foreign Application Priority Data
Apr. 14, 2010   (JP) ................................. 2010-093220

(51) Int. Cl.
H02J 7/00   (2006.01)
H02J 7/04   (2006.01)
H02J 7/16   (2006.01)

(52) U.S. Cl.
USPC ........... 320/132; 320/128; 320/134; 320/136; 320/152; 320/157

(58) Field of Classification Search ................... 320/132
See application file for complete search history.

(56) References Cited

U.S. PATENT DOCUMENTS

| 7,669,413 B2 | 3/2010 | Komiyama et al. |
| 7,728,449 B2 | 6/2010 | Kagoshima et al. |
| 7,745,947 B2 | 6/2010 | Komiyama et al. |
| 2007/0187180 A1 | 8/2007 | Kagoshima et al. |
| 2010/0102763 A1 | 4/2010 | Kagoshima et al. |

FOREIGN PATENT DOCUMENTS

JP    2005-237178    9/2005

*Primary Examiner* — Edward Tso
*Assistant Examiner* — Ahmed Omar
(74) *Attorney, Agent, or Firm* — Oblon, Spivak, McClelland, Maier & Neustadt, L.L.P.

(57) ABSTRACT

Provided is a hybrid working machine capable of performing battery charging control both for a working period and a standby period. The hybrid working machine includes a hydraulic actuator, an engine, a hydraulic pump driven by the engine to supply hydraulic fluid to the hydraulic actuator, a battery, a generator motor connected to the engine to serve as a generator by an output power of the engine to charge the battery and serve as a motor for assisting the engine by supply of an electric power from the battery, a battery monitor detecting a battery SOC, a controller which controls a charging power of the battery depending on the battery SOC, and a working state detector detecting a working state as information for discriminating between a working period during which the hydraulic actuator is actuated and a standby period during which the hydraulic actuator is not actuated. The controller limits the charging power in the standby period in comparison with in the working period.

6 Claims, 3 Drawing Sheets

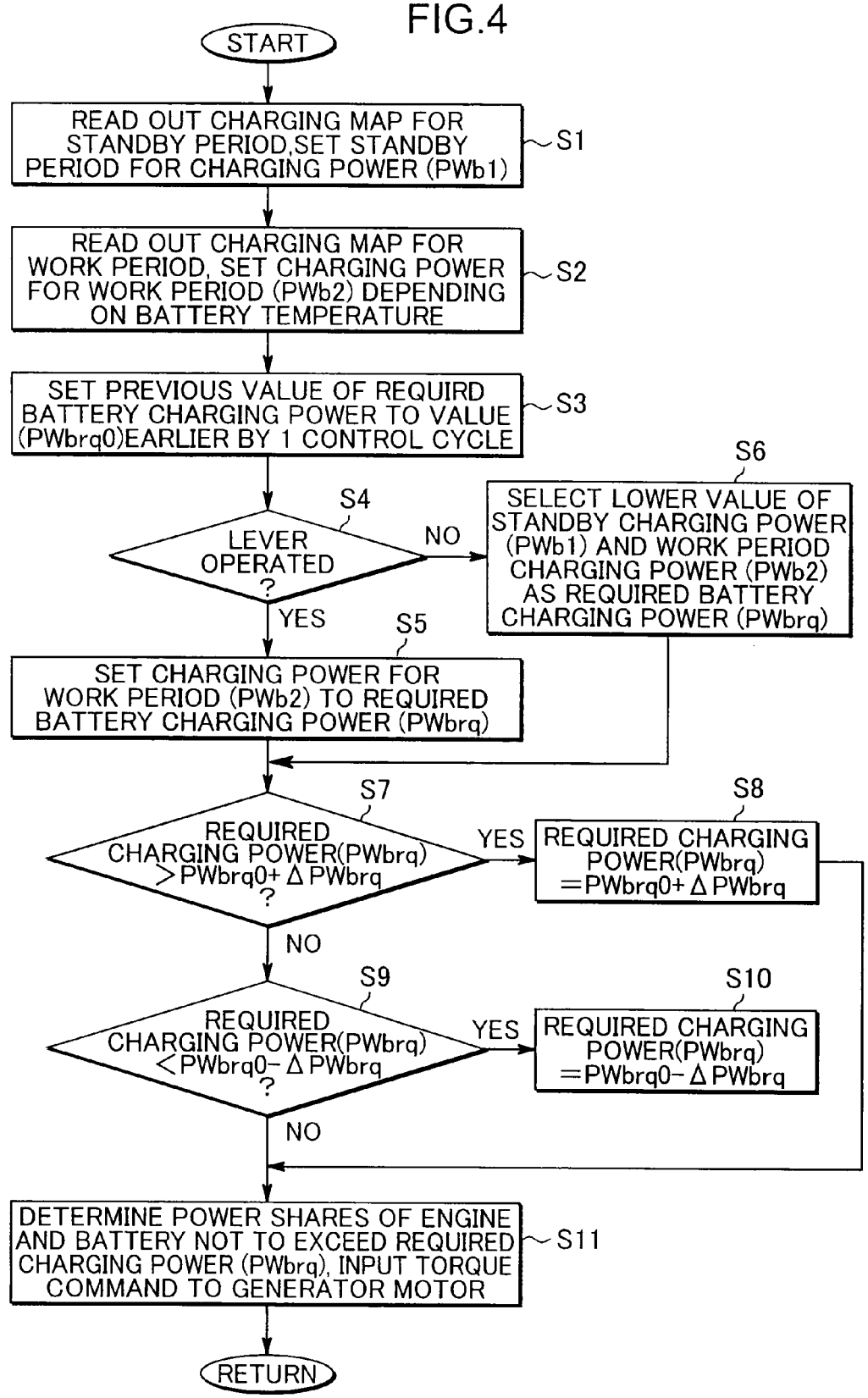

HYBRID WORKING MACHINE HAVING BATTERY PROTECTING FUNCTION

BACKGROUND OF THE INVENTION

1. Field of the Invention

The present invention relates to a hybrid working machine using an engine power and a battery power in combination.

2. Description of the Background Art

There is known a hybrid shovel as disclosed in e.g. Japanese Unexamined Patent Publication No. 2005-237178 as a hybrid working machine. The hybrid shovel includes an engine, a hydraulic pump and a generator motor connected to the engine, a hydraulic actuator driven by hydraulic fluid ejected from the hydraulic pump, and a battery for charging an electric power generated by the generator motor. The battery supplies the electric power to the generator motor as necessary to let the generator motor perform as a motor to thereby assist the engine.

The hybrid shovel is further provided with a means for detecting a battery SOC (State of Charge) indicating a charging state (charging amount) of the battery, and a means for controlling a charging power so that the charging power approaches a targeted value of SOC in accordance with the detected battery SOC. Here, since the charging performance of the battery also depends on a battery temperature, battery SOC/charging power characteristics also change depending on the battery temperature.

The hybrid working machine performing the above battery charging control, however, may involve an excessive load of the battery. Specifically, in the conventional hybrid working machine, in order to swiftly recover the battery SOC to a targeted value or stabilize the battery SOC in a condition that the battery SOC is sharply lowered by discharging during a working period, performed is a control for rapid charging by full use of the battery performance determined by the detected battery temperature and SOC, in other words, performed is setting the contents of battery control based on the control at the time of discharging; this may cause an increase in the load of the battery due to continuous rapid charging in a stand-by period with no discharging, thereby damage the battery and lower the battery life.

SUMMARY OF THE INVENTION

An object of the invention is to provide a hybrid working machine capable of performing a battery charging control for both of a working period and a stand-by period. Specifically, the invention provides a hybrid working machine comprising: a hydraulic actuator; an engine; a hydraulic pump which is connected to the engine and driven by an output power of the engine to supply hydraulic fluid to the hydraulic actuator; a battery; a generator motor which is connected to the engine to serve as a generator by the output power of the engine to charge the battery and as a motor for assisting the engine by supply of an electric power from the battery; a battery monitor which detects a battery SOC indicating a charging state of the battery; a controller which controls a charging power of the battery depending on the battery SOC detected by the battery monitor; and a working state detector which detects a working state as information for discriminating between a working period during which the hydraulic actuator is actuated and a standby period during which the hydraulic actuator is not actuated, wherein the controller limits the charging power in the standby period in comparison with in the working period.

These and other objects, features and advantages of the present invention will become more apparent upon reading the following detailed description along with the accompanying drawings.

BRIEF DESCRIPTION OF THE DRAWINGS

FIG. 4 is a flowchart showing a control operation to be performed by the controller.

DESCRIPTION OF THE PREFERRED EMBODIMENTS

Figure 1:
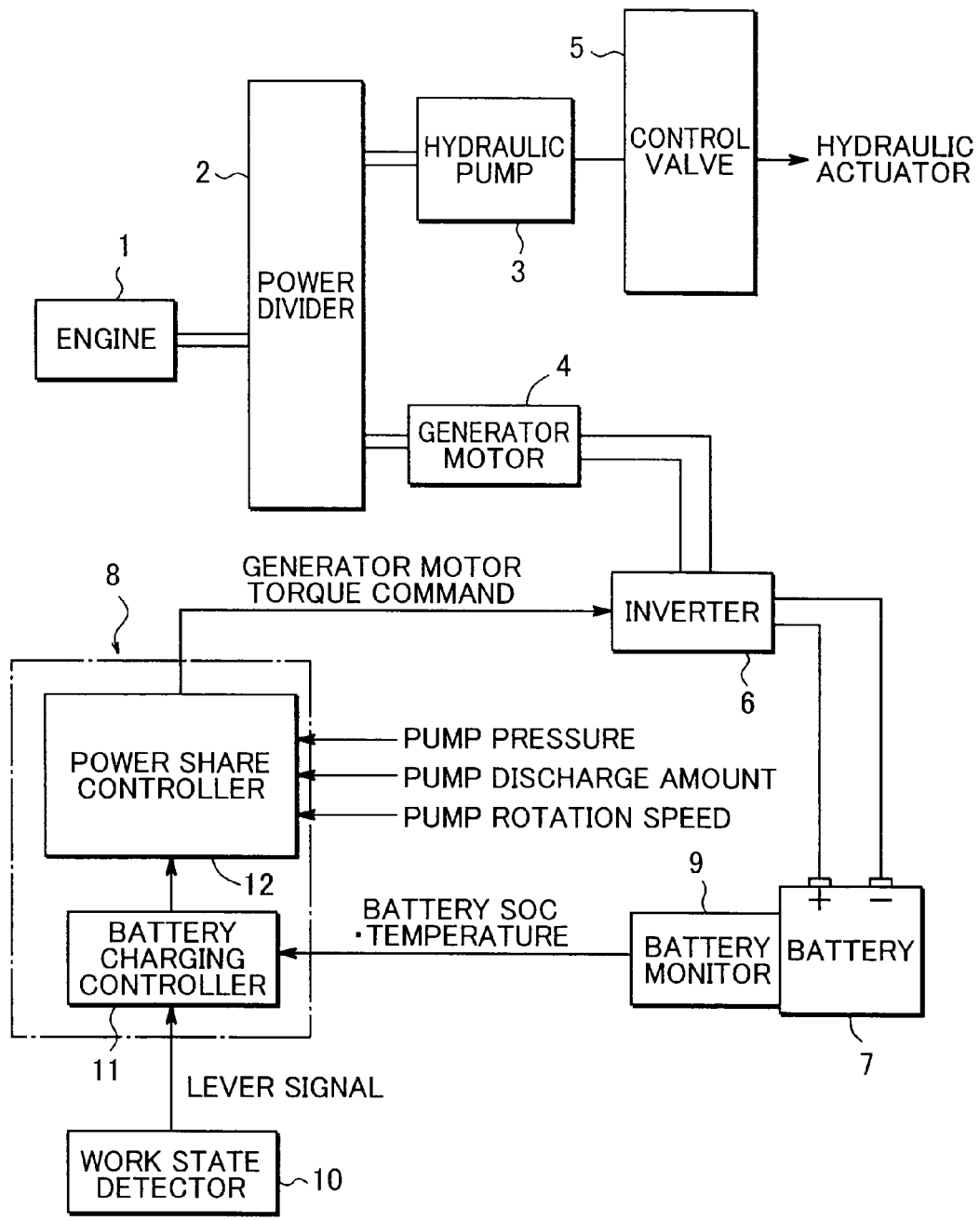
FIG. 1 is a block diagram showing main elements of a hybrid working machine embodying the invention.

FIG. 1 shows a hybrid working machine according to an embodiment of the invention. The hybrid working machine includes an engine 1, a power divider 2, a hydraulic pump 3, a generator motor 4, a plurality of hydraulic actuators, a plurality of control valves 5 provided for the respective actuators, a plurality of inverters 6, a battery 7, a controller 8, a battery monitor 9, and a working state detector 10.

The engine 1 is connected in parallel to the hydraulic pump 3 and to the generator motor 4 via the power divider 2 to drive the hydraulic pump 3 and the generator motor 4.

The hydraulic pump supplies hydraulic fluid to the hydraulic actuators via the respective control valves 5 to thereby drive the hydraulic actuators. In the case of a hybrid shovel, the hydraulic actuators are, for example, a boom cylinder, an arm cylinder, a bucket cylinder, a propelling hydraulic motor, ant others. FIG. 1 exemplarily shows only one control valve 5 and one hydraulic actuator. FIG. 1 also shows only one hydraulic pump 3, but plural hydraulic pumps may be connected in series or in parallel to the hydraulic actuator.

The generator motor 4 is connected to the battery 7 via the inverters 6. The battery 7 is, for example, a nickel-hydrogen battery or a lithium-ion battery. The generator motor 4 is operable to serve as a generator when being driven by the engine 1, thus generating an electric power for charging the battery 7. The generator motor 4 is also operable to serve as a motor for assisting the engine 1 by an electric power supplied from the battery 7.

The battery monitor 9 generates a detection signal relating to SOC and temperature of the battery 7, and inputs the detection signal to the controller 8.

The working state detector 10 detects information for discriminating between a working period during which the hydraulic actuator is driven and a standby period during which the hydraulic actuator is not driven, in other words, information relating to a working state. The working state detector 10, in this embodiment, outputs an operation detection signal (also called as a lever signal in the case of a remote control valve because the remote control valve has a lever and the lever is operated) indicative of presence or absence of an operation of an operating device (e.g. the above remote control valve) for actuating the control valve 5. The operation detection signal is also input to the controller 8.

The hybrid working machine of this embodiment is further provided with not graphically expressed detectors for detecting a pump pressure, an ejection amount, and a rotating number of the hydraulic pump 3 respectively, based on which a power that the hydraulic actuator requires (actuator request power) is determined.

The controller 8 is provided with a battery charging controller 11 for controlling charging of the battery 7 and a power share controller 12 for determining respective power shares of the generator motor 4 and the engine 1 in cooperation with the battery charging controller 11. The battery charging controller 11 stores a predetermined battery SOC/charging power map, reads a charging power corresponding to a detected battery SOC as a required charging power from the map, and transmits the read required charging power to the power share controller 12. The power share controller 12 determines the share of the engine power in the actuator request power, based on the required charging power transmitted from the power charging controller 11, and inputs a torque command to the generator motor 4 based on the determined engine power.

The controller 8 further performs a battery charge control of rapid charging by full use of the battery performance determined by the detected battery temperature and SOC during a working period while limiting the charging power for standby period so as to protect the battery 7. The purpose of the control is as follows. During a working period, that is, during a period when the lever is operated, the working involves a battery discharge which sharply lowers the battery SOC, thereby causing a requirement of rapid charging to swiftly recover the battery SOC. On the other hand, the continuous rapid charging during a period when the machine is stopped (lever non-operated period) may cause a trouble of excessive increase in the load of the battery 7, which shortens the battery life.

Figure 2:
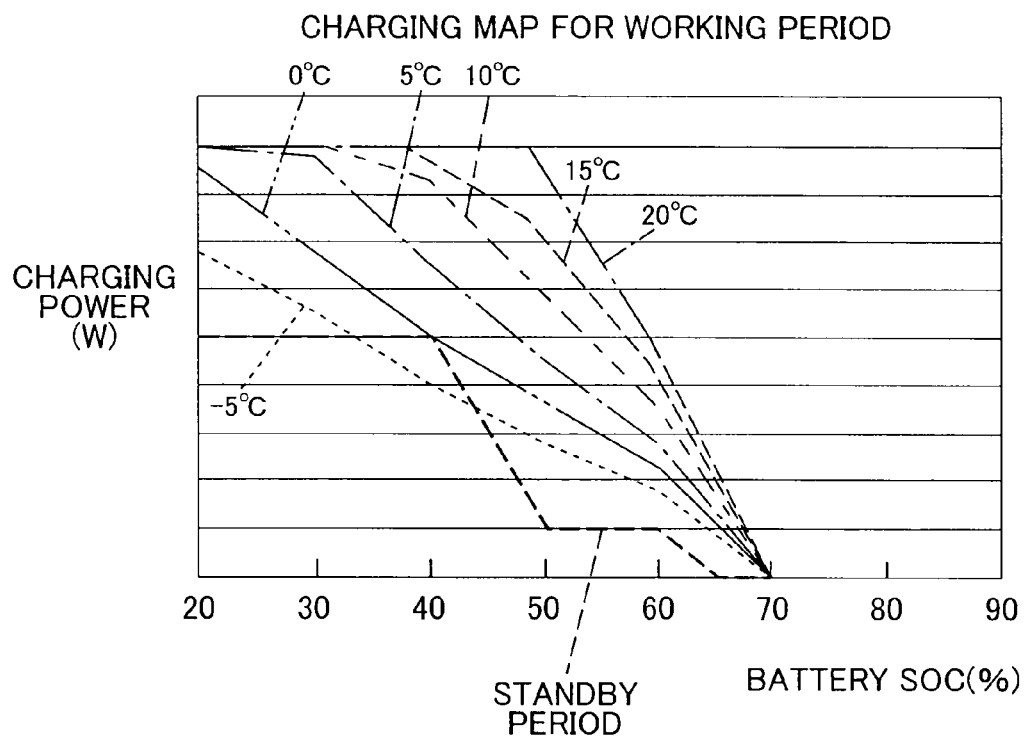
FIG. 2 is a diagram showing a charging map for working period to be stored in a controller of the hybrid working machine.
Figure 3:
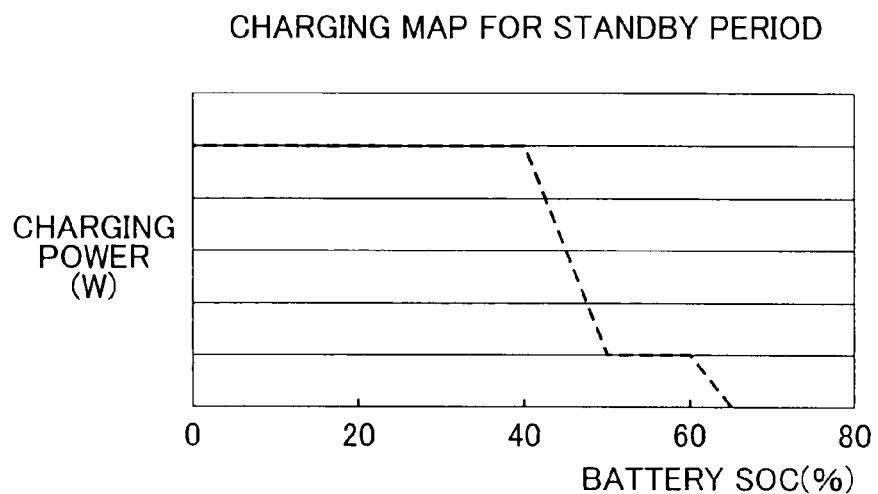
FIG. 3 is a diagram showing a charging map for standby period to be stored in the controller.

This will be more specifically described referring to FIG. 2 and FIG. 3. FIG. 2 shows a battery SOC/charging power map for a working period (charging map for working period), and FIG. 3 shows a battery SOC/charging power map for a standby period (charging map for standby period). FIG. 2 also shows the charging map for standby period by the bold broken line for easy comparison between the above two maps.

The charging map for working period is set for each of a plurality of different battery temperatures, for instance, six different battery temperatures of 0° C., 5° C., 10° C., 15° C., 20° C., and −5 C°, from which the map corresponding to a detected battery temperature during the working period is read out. For a detected temperature between two temperatures of the above set temperatures (e.g. 3° C. or 18° C.), may be read out a map corresponding to the set battery temperature closest to the detected temperature, or may be calculated a battery charging power by interpolation from a map corresponding to the battery temperature closest to the detected temperature.

Although it would be preferable that the charging map for standby period be set for each of a plurality of different battery temperatures as well as the charging map for working period, this embodiment includes, as shown in FIG. 3, only one kind of map having no relation to a battery temperature for a standby period, for non-complicated control. However, for the prevention of an excessively large charging power from acting on the battery in a low-temperature condition, there is performed a selection of a lower value, as a charging power for standby period, of two concurrently read charging powers, specifically, a charging power based on the charging map for working period corresponding to the detected battery temperature and a charging power based on the charging map for standby period. As is obvious from FIG. 2 and FIG. 3, particularly from FIG. 2, the aforementioned map is set so that the charging power for standby period is lower than that during a working period, especially in an area used in a high frequency, that is, specifically, an area where the battery SOC is no less than 50%.

Specifically, during a working period, the upper limit of the charging power is set higher than that during a standby period, in an area where the battery temperature is not a minus value, and the charging power is set higher than that during a standby period, in a full area of the battery SOC. Besides, whereas the charging power for working period corresponding to the battery SOC of 70% is set to zero (in other words, a targeted value of the battery SOC is set to 70%), the charging power for standby period corresponding to the battery SOC of 65% is set to zero (in other words, a targeted value of the battery SOC is set to 65%).

In view of the above-mentioned matter, there will be described an operation to be performed by the hybrid working machine, with reference to the flowchart of FIG. 4.

Following the start of the control, the charging map for standby period is read out in Step S1, and the charging power for standby period PWb1 corresponding to the detected battery SOC is set. Besides, the charging map for working period is read in Step S2, and the working period charging power PWb2 corresponding to the detected battery temperature and the battery SOC is set. In Step S3, a previous value of a required charging power to be used for the rate limiter process to be performed later is set to a value PWbrq0 which is one acquired at a time earlier by one control cycle.

Step S4 is a judgment whether the lever is operated or not (whether it is a working period or a standby period). For the working period (YES in Step S4), the charging power for working period PWb2 is set to a required charging power PWbrq, in Step S5. For the standby period (NO in Step S4), a lower value of the charging power for standby period PWb1 and the working period charging power PWb2 is set to the required charging power PWbrq, in Step S6. In other words, in an area of the battery temperature of a minus value, the charging power for working period PWb2 is set to the required charging power PWbrq, because the charging power for working period PWb2, in that area, is lower than the charging power for standby period PWb1, as shown in FIG. 2.

Both of Steps S5 and S6 are followed by Step S7. In Steps S7 to S10, performed is a rate limiter process for setting an amount of the change in the charging power lower than a value determined based on the map, upon switching between the charging map for working period and the charging map for standby period.

Specifically, Step S7 is a comparison between the required charging power PWbrq (set value) set in Step S5 or S6 and a value obtained by adding a predetermined value ΔPWbrq (that is, a comparison value at the time of an increase in the charging power) to the previous value PWbrq0 acquired at a time earlier by one control cycle.

In the case of YES in Step S7, that is, PWbrq>PWbrq0+ ΔPWbrq, performed is Step S8, where the lower value (PWbrq0+ΔPWbrq) is set as the required charging power (determined value).

On the other hand, in the case of NO in Step S7, that is, PWbrq≦PWbrq0+ΔPWbrq, performed is Step S9, which is a comparison between the set value PWbrq and a comparison value at the time of a decrease in the charging power, that is, a value obtained by subtracting the predetermined value ΔPWbrq from the previous value PWbrq0.

In the case of YES in Step S9, that is, PWbrq≧PWbrq0− ΔPWbrq, performed is Step S10, where the higher value (PWbrq0−ΔPWbrq) is set as the required charging power (determined value).

On the other hand, in the case of NO in Step S9, that is, in the case of neither PWbrq<PWbrq0+ΔPWbrq nor PWbrq<PWbrq0−ΔPWbrq, the set value is set as the required charging power (determined value).

Step S8, Step S10, and Step S9 (in the case of YES) is followed by Step S11, where the power share between the engine 1 and for the battery 7 is determined under the limitation that the whole power does not exceed the required charging power PWbrq as a determined value, and, in accordance with the power share, a torque command is input to the generator motor 4. The Step S11 is followed by returning to Step S1.

This control enables the battery SOC, during a working period involving repeating discharge, to be swiftly recovered by rapid charging with full use of the battery performance, while protecting the battery, during a standby period involving no discharge, against the damage due to continuous rapid charging, by the charging power limitation heavier than that in a working period. In other words, the control makes it possible to perform a battery charge suitable both for a working period and for a standby period, thus extending the battery life while optimally keeping the battery SOC.

Furthermore, Step S6 in FIG. 4, which is a selection of a lower value of the charging power PWb1 based on the charging map for working period corresponding to a detected battery temperature and the charging power PWb2 based on the charging map for standby period as the required charging power PWbrq during the standby period, makes it possible to drop the charging power for standby period in a low-temperature condition for protecting the battery 7, with a simplified control using only one kind of the stand-by period charging map having no relation to a battery temperature.

Moreover, upon switching the charging power between the working period and the standby period, the rate limiter process of Step S7 to Step S11 in FIG. 4, which suppresses a change amount of the charging power, makes the change in the charging power smooth, thereby protecting the battery 7.

The invention is not limited to the embodiment, but may include the following modifications, for instance.

(1) The judgment of whether the current time is a working period or a standby period, while performed based on a lever signal in the embodiment, may be performed based on another working state (e.g. whether the hydraulic actuator is driven or is not driven).

(2) As the charging map for standby period, there may be set a plurality of standby period dedicated maps corresponding to respective different temperatures. In other words, the charging power may be controlled based on the standby period dedicated maps during a standby period, in place of selecting a lower value as described in the embodiment.

(3) Although, in the embodiment, the hydraulic pump 3 and the generator motor 4 are connected in parallel to the engine 1 via the power divider 2 as shown in FIG. 1, the invention can be applied to a hybrid working machine including a series connection of the hydraulic pump 3 and the generator motor 4 to the engine 1.

As described above, the invention provides a hybrid working machine capable of performing battery charge control suitable for a working period and a standby period. Specifically, the hybrid working machine comprises: a hydraulic actuator; an engine; a hydraulic pump which is connected to the engine and driven by an output power of the engine to supply hydraulic fluid to the hydraulic actuator; a battery; a generator motor which is connected to the engine to serve as a generator by the output power of the engine to charge the battery and as a motor for assisting the engine by supply of an electric power from the battery; a battery monitor which detects a battery SOC indicating a charging state of the battery; a controller which controls a charging power of the battery depending on the battery SOC detected by the battery monitor; and a working state detector which detects a working state as information for discriminating between a working period during which the hydraulic actuator is actuated and a standby period during which the hydraulic actuator is not actuated, wherein the controller limits the charging power in the standby period in comparison with in the working period.

In the hybrid working machine, the working state detector provides information for discriminating between the working period and the standby period, and the controller limits the charging power in the standby period in comparison with in the working period; this enables both of swift recovery of the battery SOC by rapid charging with full use of the battery performance during the working period involving repeating discharging and protecting the battery against the damage due to continuous rapid charging during the standby period involving no discharge to be performed. In short, the battery charge both for a working period and for a standby period can be performed, which results in both of optimally keeping the battery SOC and an improvement of the battery life while.

Preferably, the controller may determine a required charging power based on a predetermined charging map for working period as to a relation between battery SOC and a charging power during the working period and determine a required charging power based on a predetermined charging map for standby period according to battery SOC/charging power characteristics different from the charging map for working period so as to limit the charging power in the standby period in comparison with in the working period. More preferably, an upper limit of the charging power in the charging map for standby period may be set lower than that in the charging map for working period.

In this case, it is more preferable that: the monitor detects a battery temperature; the controller stores a plurality of maps corresponding to respective predetermined different battery temperatures as the charging map for working period and a single kind of a map having no relation to a battery temperature as the charging map for standby period; and the controller selects, during the standby period, a lower value of the charging power based on the charging map for working period corresponding to the detected battery temperature and the charging power based on the charging map for standby period, as the required charging power. This makes it possible to suppress the charging power for the standby period in a low-temperature condition without complicating the control to thereby protect the battery.

Furthermore, the controller may, more preferably, perform a rate limiter process of setting a change amount of the charging power to a value lower than a value determined based on both of the charging map for working period and the charging map for standby period, upon switching between the charging map for working period and the charging map for standby period. The rate limiter process suppresses a change amount of the charging power upon switching the charging power between the working period and the standby period to make a change in the charging power smooth, thereby protecting the battery.

Preferably, the working state detector may be one which detects, as the working state, presence or absence of an operation of an operating device to be operated for actuating the hydraulic actuator.

This application is based on Japanese Patent Application No. 2010-093220 filed on Apr. 14, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A working machine having a battery protecting function, comprising:
   a hydraulic actuator;
   an engine;
   a hydraulic pump which is connected to the engine and driven by an output power of the engine to supply hydraulic fluid to the hydraulic actuator;
   a battery;
   a generator motor which is connected to the engine to serve as a generator by the output power of the engine to charge the battery and serve as a motor for assisting the engine by supply of an electric power from the battery;
   a battery monitor which detects a battery SOC indicating a charging state of the battery;
   a controller which controls a charging power of the battery depending on the battery SOC detected by the battery monitor; and
   a working state detector which detects a working state as information for discriminating between a working period during which the hydraulic actuator is actuated and a standby period during which the hydraulic actuator is not actuated, wherein
   the controller limits the charging power in the standby period in comparison with in the working period.

2. The hybrid working machine according to claim 1, wherein
   the controller determines a required charging power based on a predetermined charging map for working period as to a relation between battery SOC and charging power during the working period, and determines a required charging power based on a predetermined charging map for standby period based on battery SOC/charging power characteristics different from the charging map for working period so as to limit the charging power in the standby period in comparison with in the working period.

3. The hybrid working machine according to claim 2, wherein
   an upper limit of the charging power in the charging map for standby period is set lower than that in the charging map for working period.

4. The hybrid working machine according to claim 2, wherein:
   the battery monitor detects a battery temperature;
   the controller stores a plurality of maps corresponding to respective predetermined different battery temperatures, as the charging map for working period, and stores a single kind of a map having no relation to a battery temperature as the charging map for standby period; and
   the controller selects, during the standby period, a lower value of the charging power based on the charging map for working period corresponding to the detected battery temperature and the charging power based on the charging map for standby period, as the required charging power.

5. The hybrid working machine according to claim 2, wherein
   the controller performs a rate limiter process of setting a change amount of the charging power to a lower value than a value determined by both of the charging map for working period and the charging map for standby period upon switching between the charging map for working period and the charging map for standby period.

6. The hybrid working machine according to claim 1, wherein
   the working state detector detects, as a working state, presence or absence of an operation of an operating device to be operated for actuating the hydraulic actuator.

* * * * *